(12) United States Patent
Tipton et al.

(10) Patent No.: US 10,029,561 B2
(45) Date of Patent: Jul. 24, 2018

(54) LIQUID RESERVOIR SYSTEM AND METHOD

(71) Applicant: HOLLEY PERFORMANCE PRODUCTS INC., Bowling Green, KY (US)

(72) Inventors: Larry J. Tipton, Bowling Green, KY (US); Shane Weckerly, Bowling Green, KY (US)

(73) Assignee: Holley Performance Products, Inc., Bowling Green, KY (US)

( * ) Notice: Subject to any disclaimer, the term of this patent is extended or adjusted under 35 U.S.C. 154(b) by 110 days.

(21) Appl. No.: 14/936,017

(22) Filed: Nov. 9, 2015

(65) Prior Publication Data
US 2016/0129782 A1 May 12, 2016

Related U.S. Application Data

(60) Provisional application No. 62/076,718, filed on Nov. 7, 2014.

(51) Int. Cl.
| | |
|---|---|
| *B60K 15/06* | (2006.01) |
| *B60K 15/077* | (2006.01) |
| *B01D 35/00* | (2006.01) |
| *B60K 15/03* | (2006.01) |
| *B01D 35/027* | (2006.01) |

(52) U.S. Cl.
CPC ........ *B60K 15/077* (2013.01); *B01D 35/0273* (2013.01); *B60K 2015/03105* (2013.01);
(Continued)

(58) Field of Classification Search
CPC ........ B60K 15/077; B60K 2015/03105; B60K 2015/03243; B60K 2015/03236; B60K 2015/0777; B01D 35/0273
(Continued)

(56) References Cited

U.S. PATENT DOCUMENTS

| | | | |
|---|---|---|---|
| 4,176,633 A | 12/1979 | McCabe | |
| 4,193,947 A | 3/1980 | Ralph | |
| 4,225,536 A | 9/1980 | Dougherty et al. | |
| 4,246,875 A | 1/1981 | Bier et al. | |
| 4,246,929 A | 1/1981 | Wakeman | |
| 4,283,353 A | 8/1981 | Miller | |
| 4,465,640 A | 8/1984 | Dougherty | |
| 4,539,960 A | 9/1985 | Cowles | |
| 4,798,190 A | 1/1989 | Vaznaian et al. | |
| 4,798,329 A | 1/1989 | Mesenich | |
| 4,827,888 A | 5/1989 | Vaznaian et al. | |
| 5,009,390 A | 4/1991 | McAuliffe et al. | |
| 5,012,780 A | 5/1991 | Bugamelli | |
| 5,091,858 A | 2/1992 | Paielli | |
| 5,111,793 A | 5/1992 | Deeds | |
| 5,113,831 A | 5/1992 | Grant | |

(Continued)

FOREIGN PATENT DOCUMENTS

| | | |
|---|---|---|
| GB | 507914 | 5/2005 |
| GB | 2409239 | 10/2012 |

(Continued)

OTHER PUBLICATIONS

PCT Notification of Transmittal of the International Search Report and the Written Opinion of the International 1 Searching Authority, or the Declaration, International Search Report dated Feb. 26, 2016, International Application No. US2015/059715.

(Continued)

*Primary Examiner* — Madeline Gonzalez

(74) *Attorney, Agent, or Firm* — Middleton Reutlinger

(57) ABSTRACT

Liquid reservoir systems are disclosed. In one embodiment, a liquid reservoir system may capture and retain a fuel reservoir to provide an uninterrupted fuel supply to a fuel pump or pickup line during low fuel conditions such as those that may be experienced during vehicle acceleration, braking or side to side maneuvers. It may also capture and retain a fuel reservoir to provide an uninterrupted fuel supply to a fuel pump or other pickup line during periods of high agitation such as may be experienced during vehicle jumping, cross country/closed course racing and other aggressive driving maneuvers.

33 Claims, 11 Drawing Sheets

(52) U.S. Cl.
CPC ............. *B60K 2015/03236* (2013.01); *B60K 2015/03243* (2013.01); *B60K 2015/0777* (2013.01)

(58) Field of Classification Search
USPC ....... 210/172.3, 172.4, 172.2, 172.6, 167.01, 210/167.08, 167.02, 416.4
See application file for complete search history.

(56) References Cited

U.S. PATENT DOCUMENTS

| | | |
|---|---|---|
| 5,123,436 A | 6/1992 | Koechlein et al. |
| 5,170,764 A | 12/1992 | Tuckey |
| 5,186,147 A | 2/1993 | Bellis |
| 5,211,205 A | 5/1993 | Grant et al. |
| 5,235,948 A | 8/1993 | Grant et al. |
| 5,261,382 A | 11/1993 | Nikolai |
| 5,341,785 A | 8/1994 | Meaney |
| 5,551,404 A | 9/1996 | Bauerle et al. |
| 5,647,329 A * | 7/1997 | Bucci ............... B01D 35/0273 123/509 |
| 5,665,229 A | 9/1997 | Fitzpatrick et al. |
| 5,716,522 A | 2/1998 | Chilton et al. |
| 5,807,483 A | 9/1998 | Cassidy et al. |
| 5,820,754 A | 10/1998 | Cassidy et al. |
| 5,865,157 A | 2/1999 | Romanelli et al. |
| 5,876,599 A | 3/1999 | Sylvester et al. |
| 5,887,569 A | 3/1999 | Romanelli et al. |
| 5,890,476 A | 4/1999 | Grant |
| 5,902,480 A | 5/1999 | Chilton et al. |
| 5,904,130 A | 5/1999 | Romanelli |
| 6,119,670 A | 9/2000 | Eitan |
| 6,220,454 B1 | 4/2001 | Chilton |
| 6,235,073 B1 | 5/2001 | Bannister et al. |
| 6,378,512 B1 | 4/2002 | Staggemeier |
| 6,464,870 B1 | 10/2002 | Castellanos et al. |
| 6,471,072 B1 | 10/2002 | Rickle et al. |
| 6,520,488 B1 | 2/2003 | Braswell |
| 6,569,219 B1 | 5/2003 | Connor et al. |
| 6,613,227 B2 | 9/2003 | Rickle |
| D486,409 S | 2/2004 | Braswell et al. |
| 6,740,236 B2 | 5/2004 | Rickle et al. |
| 6,837,228 B2 | 1/2005 | Grant |
| 6,843,913 B2 | 1/2005 | Baasch et al. |
| 6,901,888 B2 | 6/2005 | Baasch et al. |
| 6,913,210 B2 | 7/2005 | Baasch et al. |
| 6,997,401 B2 | 2/2006 | Uhde et al. |
| 7,066,155 B2 | 6/2006 | Grant |
| 7,070,641 B1 | 7/2006 | Gunderson et al. |
| 7,156,625 B2 | 1/2007 | Grant |
| 7,168,690 B2 | 1/2007 | Grant |
| 7,207,786 B2 | 4/2007 | Grant |
| D543,555 S | 5/2007 | Braswell et al. |
| 7,217,361 B2 | 5/2007 | Connor et al. |
| D543,999 S | 6/2007 | Benoit |
| 7,247,183 B2 | 7/2007 | Connor et al. |
| 7,255,331 B2 | 8/2007 | Grant |
| D555,668 S | 11/2007 | Benoit |
| 7,343,896 B2 | 3/2008 | Grant |
| D578,550 S | 10/2008 | Grant |
| 7,634,983 B2 | 12/2009 | Grant |
| 7,806,096 B2 | 10/2010 | Grant |
| 7,927,400 B2 | 4/2011 | Graber et al. |
| 7,976,712 B2 | 7/2011 | Rocheux et al. |
| D645,055 S | 9/2011 | Benoit |
| D645,057 S | 9/2011 | Benoit |
| D645,058 S | 9/2011 | Benoit |
| D648,746 S | 11/2011 | Tipton et al. |
| D649,979 S | 12/2011 | Gieske et al. |
| 8,080,086 B2 | 12/2011 | Graber et al. |
| D653,263 S | 1/2012 | Gieske et al. |
| D659,164 S | 5/2012 | Tomlinson et al. |
| 8,372,278 B1 * | 2/2013 | Nguyen ............. B01D 35/0273 123/196 A |
| D677,755 S | 3/2013 | Tipton et al. |
| D680,134 S | 4/2013 | Fordyce et al. |
| 8,490,682 B2 | 7/2013 | Graber et al. |
| 8,524,091 B2 | 9/2013 | Rocheux et al. |
| D696,300 S | 12/2013 | Arotzarena et al. |
| 8,715,497 B2 | 5/2014 | Schnipke et al. |
| 8,728,308 B2 | 5/2014 | Schnipke et al. |
| 8,763,175 B2 | 7/2014 | Li et al. |
| D721,389 S | 1/2015 | Gieske et al. |
| D724,179 S | 3/2015 | Keenan et al. |
| 9,212,642 B2 | 12/2015 | Petersen |
| 9,441,571 B2 | 9/2016 | Grant |
| 9,555,353 B2 | 1/2017 | Graber et al. |
| 2002/0033168 A1 | 3/2002 | Noda |
| 2003/0057146 A1 | 3/2003 | Rickle et al. |
| 2003/0057149 A1 | 3/2003 | Iwamoto |
| 2003/0062428 A1 | 4/2003 | Baasch et al. |
| 2003/0132156 A1 | 7/2003 | Rickle |
| 2004/0025832 A1 | 2/2004 | Baasch et al. |
| 2004/0084032 A1 | 5/2004 | Baasch et al. |
| 2004/0094488 A1 | 5/2004 | Grant |
| 2004/0139950 A1 | 7/2004 | Flynn et al. |
| 2004/0146413 A1 | 7/2004 | Grant |
| 2004/0251194 A1 | 12/2004 | Brzozowski et al. |
| 2005/0006300 A1 | 1/2005 | Sato et al. |
| 2005/0023210 A1 | 2/2005 | Connor et al. |
| 2005/0084391 A1 | 4/2005 | Grant |
| 2005/0284451 A1 | 12/2005 | Uhde et al. |
| 2006/0064956 A1 | 3/2006 | Connor et al. |
| 2008/0308068 A1 | 12/2008 | Grant |
| 2009/0084736 A1 | 4/2009 | Rocheux et al. |
| 2009/0120858 A1 | 5/2009 | Kojima et al. |
| 2009/0249951 A1 | 10/2009 | Graber et al. |
| 2010/0181238 A1 | 7/2010 | Henry |
| 2010/0294464 A1 | 11/2010 | Graber et al. |
| 2011/0155658 A1 | 6/2011 | Graber et al. |
| 2011/0233123 A1 | 9/2011 | Rocheux et al. |
| 2012/0175297 A1 | 7/2012 | Schnipke et al. |
| 2012/0183459 A1 | 7/2012 | Rocheux |
| 2012/0248021 A1 | 10/2012 | Schnipke et al. |
| 2012/0248024 A1 | 10/2012 | Wells et al. |
| 2012/0294731 A1 | 11/2012 | Weckerly et al. |
| 2012/0294732 A1 | 11/2012 | Weckerly et al. |
| 2013/0298868 A1 | 11/2013 | Wittkopf et al. |
| 2013/0298871 A1 | 11/2013 | Bennett et al. |
| 2014/0127066 A1 | 5/2014 | Weckerly et al. |
| 2014/0144914 A1 * | 5/2014 | Yager ............... B62J 35/00 220/563 |
| 2014/0158091 A1 | 6/2014 | Petersen |
| 2014/0202951 A1 | 7/2014 | Graber et al. |
| 2014/0238510 A1 | 8/2014 | Henry et al. |
| 2015/0108256 A1 | 4/2015 | Flynn et al. |
| 2015/0114347 A1 | 4/2015 | Hudnall et al. |
| 2016/0025050 A1 | 1/2016 | Salsburey |
| 2016/0201581 A1 | 7/2016 | Wittkopf et al. |
| 2016/0339363 A1 | 11/2016 | Yost et al. |
| 2017/0173500 A1 | 5/2017 | Salsburey et al. |
| 2017/0166045 A1 | 6/2017 | Tipton |

FOREIGN PATENT DOCUMENTS

| | | |
|---|---|---|
| JP | 2012036792 | 2/2012 |
| JP | 2012036792 A | 2/2012 |
| WO | 03027476 | 8/2003 |
| WO | 2004042221 | 9/2004 |
| WO | 2015108657 | 7/2015 |
| WO | 2016073978 | 5/2016 |
| WO | 2017106331 | 6/2017 |

OTHER PUBLICATIONS

Transmittal Letter of Related Cases.
U.S. Patent and Trademark Office International Search Report and Written Opinion for PCT/US2015/059715 dated Mar. 2, 2016.
U.S. Patent and Trademark Office International Search Report and Written Opinion for PCT/US2016/066638 dated Jan. 31, 2017.

* cited by examiner

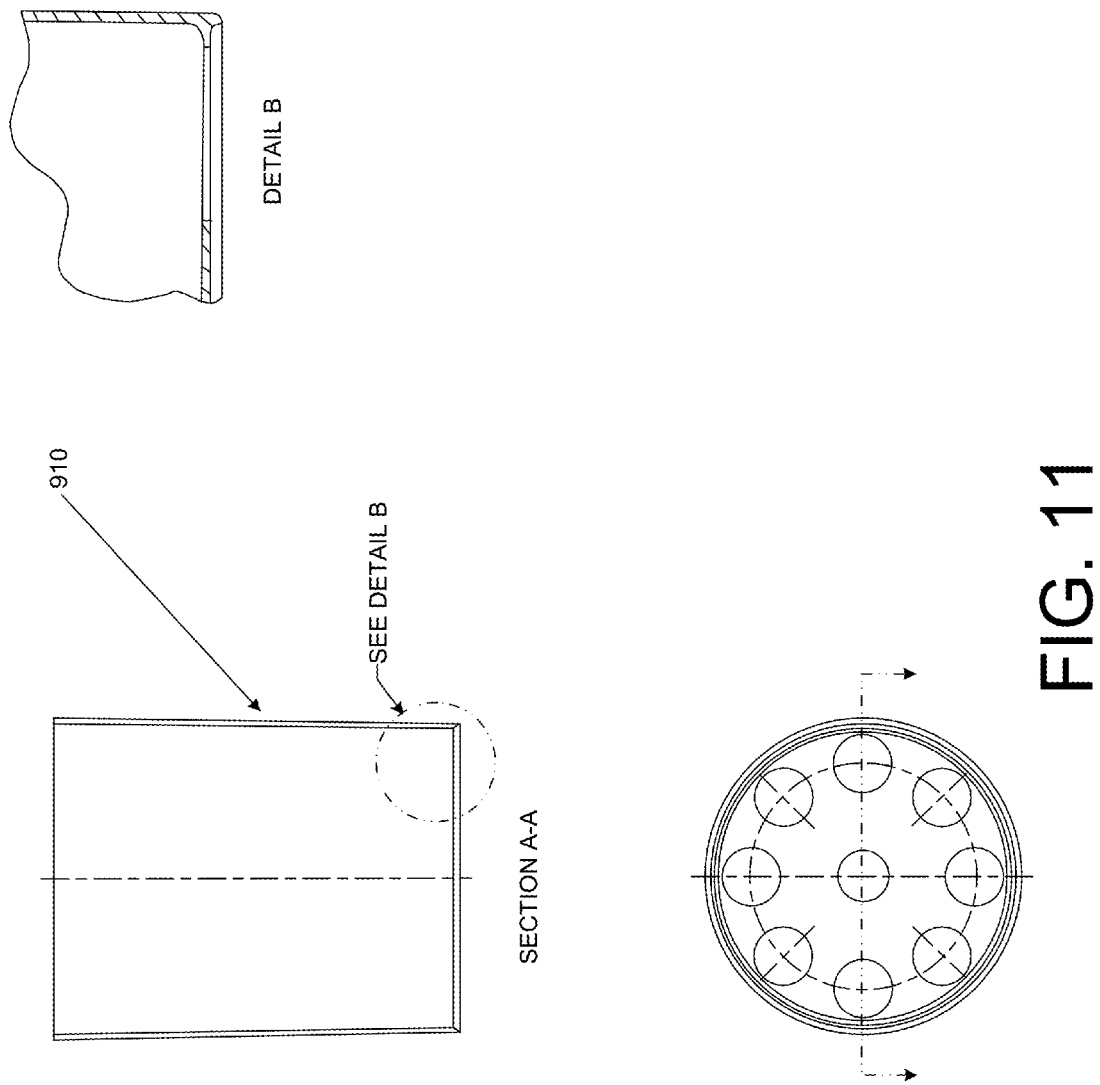

LIQUID RESERVOIR SYSTEM AND METHOD

RELATED APPLICATIONS

This application claims priority to U.S. Provisional Patent Application Ser. No. 62/076,718, filed Nov. 7, 2014, the disclosure of which is incorporated, by reference, in its entirety.

BACKGROUND OF THE INVENTION

1. Field of the Invention

The present invention generally relates to liquid reservoir systems that provide fluids/liquid to a mechanical or electric pump.

2. Description of Related Art

Many existing fuel delivery reservoir systems rely on a jet pump to sweep fuel from the fuel tank to fill the reservoir by virtue of the siphon effect. This reservoir fuel is then used to supply the fuel pump. The jet pump uses the pressurized discharge fuel from the electrical fuel pump and/or the discharge of the fuel pressure regulator. During some driving conditions, such as centripetal/centrifugal and/or other positive or negative gravitational "G" forces caused by turns rapid acceleration/deceleration, rapid elevation change and/or angular orientation change events can move fuel away from the jet jump, preventing the jet pump from pumping more fuel into the fuel reservoir. When the limited supply of fuel in the reservoir is depleted, the fuel pump cannot pump fuel to the engine, and the engine may stall from lack of fuel, even though there is fuel in the fuel tank.

Some other existing fuel delivery reservoir systems try to remedy the loss of fuel being provided to the fuel reservoir by using baffles to form a wall around the fuel pump in an attempt to hold a portion of the fuel near the pump inlet. However, this only slows the movement of fuel away from the pump inlet by virtue of one-way flaps or other means to capture fuel. This approach does not use a syphon jet so it is limited to the fuel level in the tank, and cannot keep the available fuel at a level above the pump inlet indefinitely. This method relies on some alternate motion of the vehicle to "slosh" the fuel back through the baffled openings into the fuel reservoir. Since the baffle flaps seal by their own weight, their effectiveness is consistently poor.

SUMMARY OF THE INVENTION

Liquid reservoir systems are disclosed. In one embodiment, a liquid reservoir system may capture and retain a fuel reservoir to provide an un-interrupted fuel supply to a fuel pump or pickup line during low fuel conditions such as those that may be experienced during vehicle acceleration, braking or side to side maneuvers. It may also capture and retain a fuel reservoir to provide an un-interrupted fuel supply to a fuel pump or other pickup line during periods of high agitation such as may be experienced during vehicle jumping, cross country/closed course racing and other aggressive driving maneuvers.

In one embodiment, a liquid reservoir system may capture and retains a fuel reservoir to ensure that all available fuel in the larger fuel tank is absorbed, captured and consumed, which may extend the time between racing pit stops and refueling times.

In one embodiment, a plurality of liquid reservoir systems may be connected in series so that each reservoir may capture and feed fuel when fuel is available, but may be sealed off when fuel in that area runs dry.

In another embodiment, liquid reservoir system 600 may be used in saddle-tank applications using, for example, a transfer tube.

In one embodiment, a liquid reservoir system may move fuel from a lower portion of the tank or a saddle tank to the actual pump location.

In one embodiment, a liquid reservoir may provide fuel when a vehicle (e.g., aircraft) is inverted, may be inverted, or is recovering from being inverted.

In one embodiment, a liquid reservoir may assist in blocking, eliminating, and/or excluding air bubble intrusion into main fuel feed line.

In one embodiment, a liquid reservoir may act as a pre-filter before the fuel pump.

In one embodiment, a liquid reservoir may act as a "dual reservoir" providing extended protection in extreme situations.

In one embodiment, a liquid reservoir may work with any liquid having a sufficient surface tension and wicking ability. The liquid reservoir may have a variety of applications, including vehicle, aircraft, boating, military, etc.

In one embodiment, a liquid reservoir may have any suitable shape that is conducive to being inserted thru a small hole, such as an "x" shape, spider shape, etc.

BRIEF DESCRIPTION OF THE DRAWINGS

Purposes and advantages of the exemplary embodiments will be apparent to those of ordinary skill in the art from the following detailed description in conjunction with the drawings in which like reference characters are used to indicate like elements, and in which:

FIG. 11 is an exemplary external reservoir.

DETAILED DESCRIPTION OF THE PREFERRED EMBODIMENTS

Figure 1:
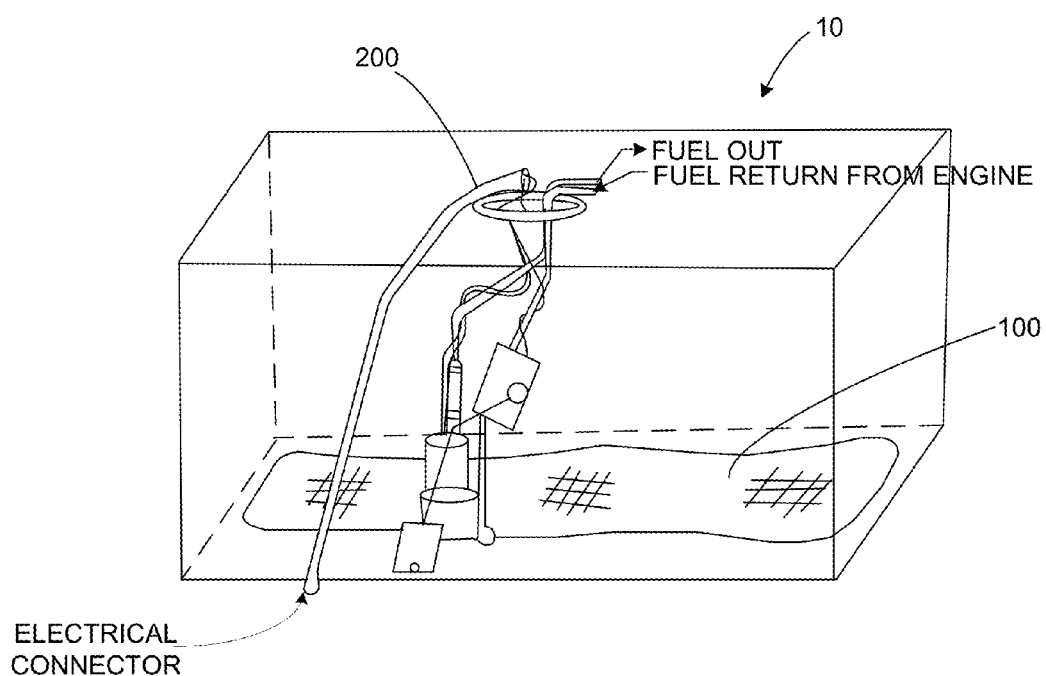
FIG. 1 is an isometric plan view of an embodiment of a liquid reservoir system installed in a fuel tank with and internal fuel sender assembly according to one embodiment.

The following description is intended to convey a thorough understanding of the embodiments by providing a number of specific embodiments and details involving a liquid reservoir system. It is understood, however, that the invention is not limited to these specific embodiments and details, which are exemplary only. It is further understood that one possessing ordinary skill in the art, in light of known devices, systems and methods, would appreciate the use of the invention for its intended purposes and benefits in any number of alternative embodiments.

In any type of pumping system, providing a constant, uninterrupted flow of liquid to the pumping device is imperative for optimum performance, pump longevity and pressure consistency. When the supply of liquid is interrupted, air pockets may be ingested by the respective pumping system. These air pockets will cause pressure drops/spikes, cavitation, aeration of the liquid, undesirable noise, possible pump damage (if the pumped liquid also serves as a pump lubricant), and higher pump operating temperatures.

In any device where the liquid pump operates in an environment where the flow of liquid may be interrupted (e.g., by low liquid levels, external forces such as centrifugal forces), there is a benefit to a device that captures the incoming liquid and retains the liquid so that it can be presented to the inlet of the pump in an uninterrupted manner until the reservoir/tank is completely empty or normal reservoir levels are restored.

One specific use of the devices disclosed herein is in automotive/vehicle fuel tanks. Early fuel tanks that were designed for carbureted vehicles had a simple pick-up tube that extended down into the tank and served as an inlet for the engine-mounted mechanical fuel pump. During normal cornering with low fuel levels, the pick-up tube becomes uncovered, allowing air to enter the fuel system. This was not a significant problem as the engine continued to run using the fuel that was retained in the carburetor float bowl until normal fuel flow resumed. Air that was present in the float bowl was naturally vented to the atmosphere.

Many of these vintage vehicles, however, have been converted to electronic fuel injection. When the conversions are done, many people retain the stock type fuel tank and use an in-line fuel injection pump. This may create several issues as there is no longer a reservoir of fuel kept in the carburetor because the carburetor has been removed. For example, the vehicle may stall as soon as the fuel pick-up tube is uncovered (due to air entry into the fuel pump), leading to poor performance and possibly dangerous situations. Moreover, there is no mechanism to vent air—once in the system, the air must be pushed through the injectors.

In modern vehicles, fuel systems have transitioned to fuel injection with fuel pumps mounted inside the tanks within "fuel modules." These fuel modules utilize jet pumps to refill a reservoir from which the fuel pump is fed. This design is typically acceptable for OEM applications, but is insufficient for extreme applications often found in road racing, oval track racing, autocross, off-road racing, motorcycles, ATV's, snowmobiles, aircraft and other extreme applications.

According to embodiments, these and other shortcomings are addressed by providing an uninterrupted supply of fuel/liquid to the pump inlet through the use of a reservoir mat/blanket. The blanket actively collects and retains liquid inside in its reservoir through scavenging, absorption, wicking, capillary action, and/or self-sealing action to exhaust the supply of the liquid in the tank before the liquid supply to the pump is interrupted.

In one embodiment, while the present disclosure may be primarily in the context of a fuel environment, it should be recognized that the disclosure is not so limited. The present disclosure may be used with a variety of fuels (e.g., gasoline, diesel, aircraft fuel (e.g., Jet-A, Jet-Propellant, etc.), biofuels, liquid propane, etc. It may be used with other liquids as well, for example, water, antifreeze, oil, chemicals, beverages (e.g., milk, juice, etc.).

In the following embodiments, the liquid reservoir system may provide a reservoir of liquid, such as fuel, for a vehicle system. In addition, it may draw the liquid to a pump or other vacuum source, such as a fuel pump, and may also prevent air from being drawn into the pump. It may further filter the fuel.

In one embodiment, the liquid reservoir system may have some or all the following properties. First, the depth media micron rating may be 15 microns. The liquid reservoir system may be sized to reach critical pickup areas with enough surface area to supply fuel system when tank goes dry or fuel cannot be reached. The liquid reservoir system may be shaped based on size and on installation requirements (e.g., the size of the hole through which the liquid reservoir system will be installed). The internal volume may be selected to provide a safety cushion of fuel supply if the tank is exhausted or run to a level where the pickup cannot reach fuel. The inlet configuration may be selected (e.g., multiple inlets, fitting type, etc.) for the specific application. Internal baffling may be provided for high g-Force applications. The packaging may be application-dependent based on the tank's intended use, whether the tank has baffles or not, shape of tank and fluid dynamics of tank shape (e.g., wide/flat, tall/skinny, and saddle tanks (e.g., one tank with a "hump" in the middle) require different shapes), etc. Magnets and other retention devices may be used to secure the liquid reservoir system in one location in the tank.

Figure 2:
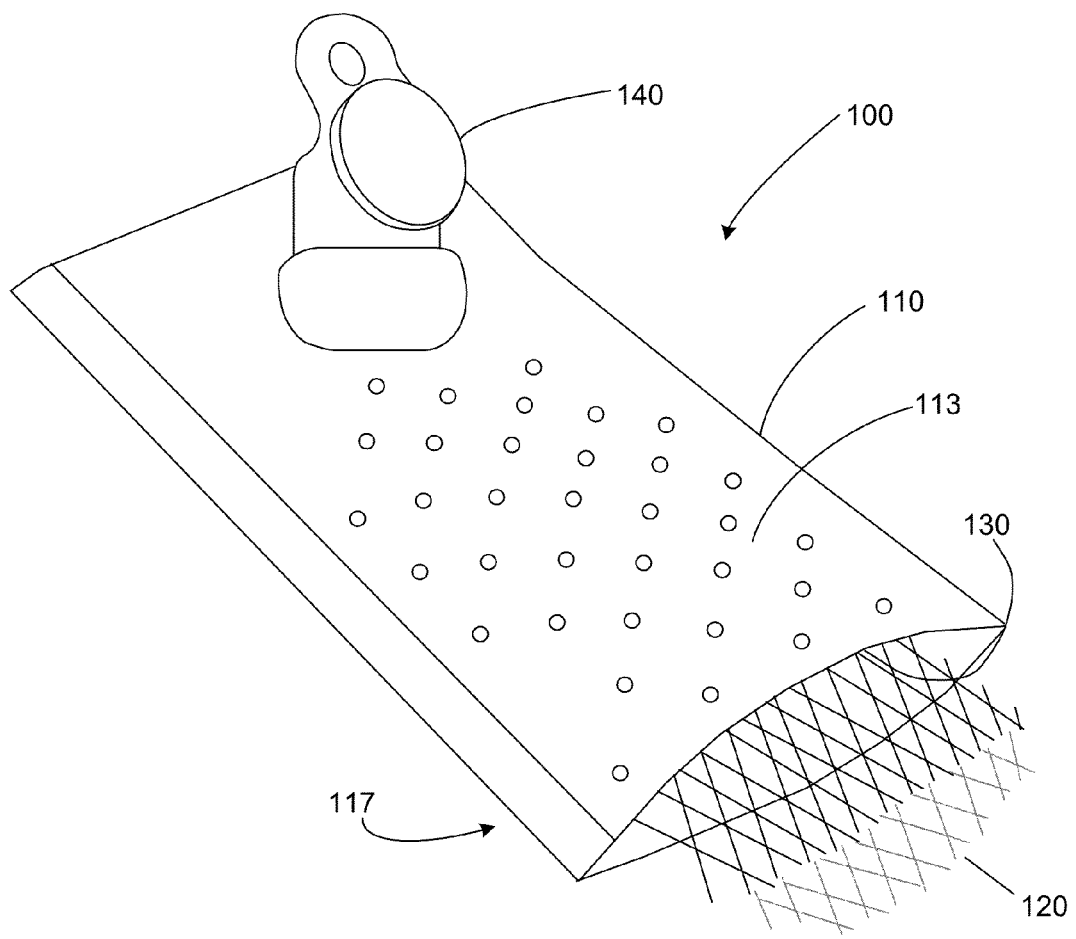
FIG. 2 is an isometric cutaway view of a liquid reservoir system according to one embodiment.

Referring to FIGS. 1 and 2, an exemplary embodiment of liquid reservoir system 100 is provided. Liquid reservoir system 100 may be provided with internal structure 120 that may provide structural rigidity to internal cavity/reservoir volume 130 in liquid reservoir system 100. Internal structure 120 may be fully contained within enclosure 110, or include external supports. Internal structure 120 may be made of fuel-compatible plastics, composites, metals, other materials, and combinations thereof.

In one embodiment, internal structure 120 may be a cylindrical plastic mesh tube as shown in FIG. 2. In another embodiment, the internal structure may be a half-cylinder made of plastic mesh. In another embodiment, internal structure 120 may comprise pieces of semi-circular plastic mesh. In another embodiment, internal structure 120 may comprise a plurality of pieces of semi-circular plastic mesh that may interact with one another. In other embodiments, internal structure 120 may be shaped as a spring coil or other structural members such as struts, trusses, box frames and the like. In one embodiment, open-cell foam may be used.

Internal structure 120 may be at least partially collapsible to allow insertion and removal through small openings in a fuel tank 10, such as sender assembly opening 200.

Figure 3:
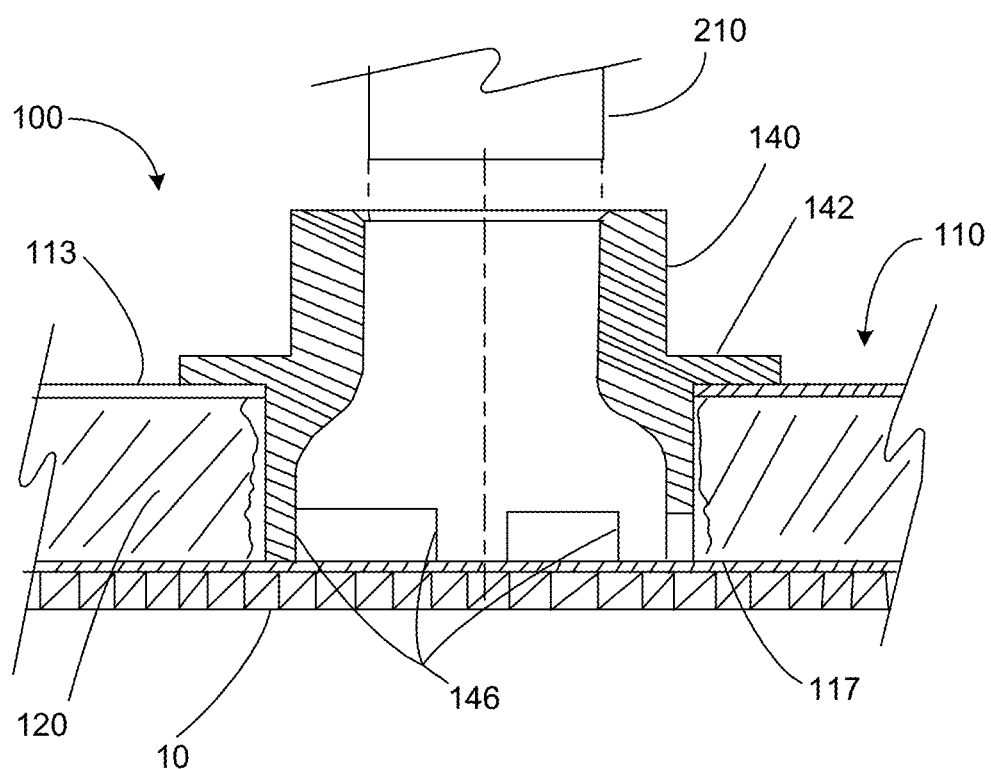
FIG. 3 is a cross section view of a liquid reservoir system having an outlet port according to one embodiment.

In one embodiment, port 140 may include flange 142 that may be coupled or otherwise adhered to top surface 113 of enclosure 110, as shown in FIG. 3. Port 140 may also include one or more standoff 146. When installed in a fuel tank, standoffs 146 may prevent suction and/or the weight of fuel pump 210 from collapsing internal structure 120 in order to maintain a flow path for the fuel in liquid reservoir system 100 into fuel pump 210.

In one embodiment, port 140 may be designed to either couple directly to an inlet of internal fuel pump 210 by a press fit, threads, adhesive and/or mechanical clamps. In another embodiment, port 140 may couple to a hose or tube that is connected to an external fuel pump (not shown). When coupled to an external fuel pump, port 140 may include a standard AN-type or external flare fuel fitting, inverted flare fitting, pipe thread or hose barb.

Port 140 may be made of a plastic and/or a composite material and may be attached directly to top surface 113 or it may be secured mechanically thru the wall of the reservoir using, for example, sealing washers and fasteners, or any other suitable securing mechanism or technique.

In one embodiment, internal structure 120 and port 140 may be molded directly into and/or as part of enclosure 110 as a single piece liquid reservoir system 100.

In one embodiment, more than one port 140 may be provided. For example, ports 140 may be positioned on liquid reservoir system 100 in any location where the fluid may be located (or where it is expected to be located) during low level conditions, due to centrifugal force, etc. The surface tension of the liquid may prevent air from being pulled from a port 140 that has no liquid present while another port 140 has liquid present.

For example, for a vehicle on a circle/oval racetrack, ports 140 may be provided on the right-hand side of the liquid reservoir system 100. For a vehicle on a road course, ports 140 may be provided on the left and right sides of liquid reservoir system 100, as well as in the middle. In a saddle tank, a first port 140 may be provided on one end of the "saddle," while a second port 140 may be provided on the other end of the "saddle." The positioning may be determined based on the anticipated forces to be experienced, and the one or more ports 140 may be positioned on liquid reservoir system 100 as necessary and/or desired.

In one embodiment, multiple ports 140 may connect to the same pump or to a different pump. In one embodiment, the paths from ports 140 may be joined within liquid reservoir system 100, or external to liquid reservoir system 100.

Figure 4A:
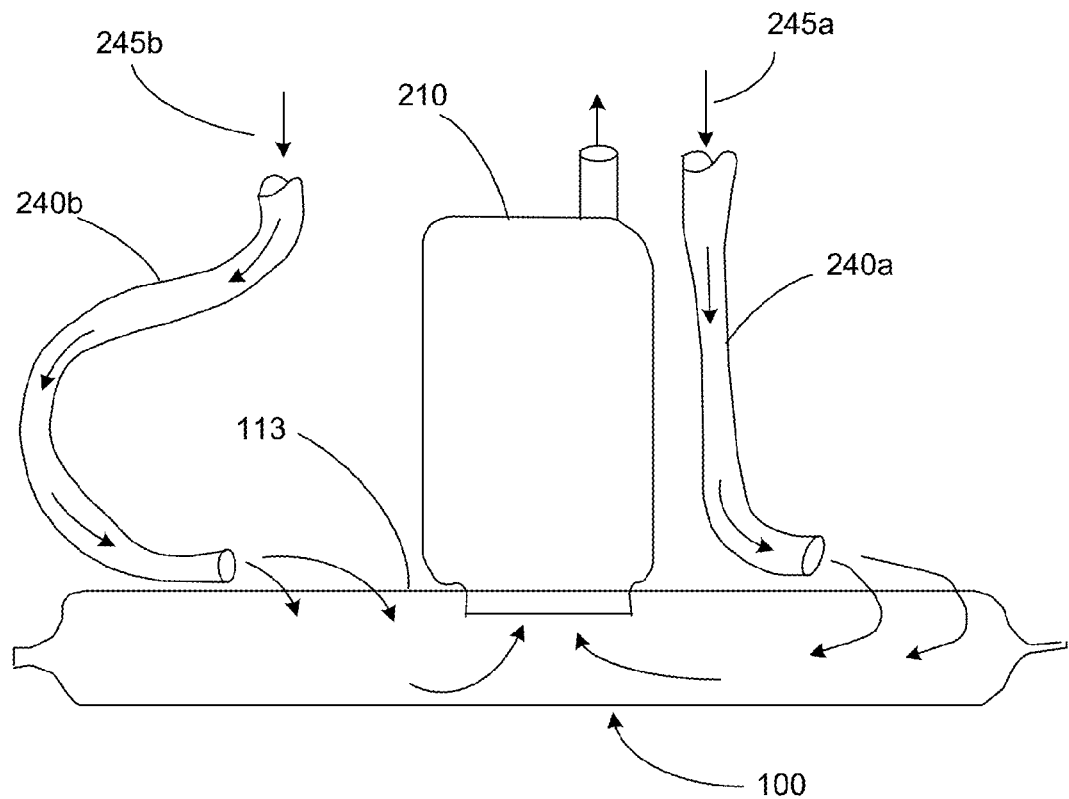
FIG. 4A is a schematic side view of the a liquid reservoir system showing embodiments of return fuel line configurations.

In one embodiment, fuel return line 240*a* or 240*b* of the sender assembly 200 may be directed to the bottom on the tank and then discharge parallel to the liquid reservoir system 100 just above its top surface 113, as shown in FIG. 4A. Direct impact of return fuel 245*a/b* may force vapor bubbles thru the media of the liquid reservoir system 100 causing pressure fluctuations or complete pressure loss. The total pressure loss can occur with a low fuel condition when there is more vapor bubbles in the return line due to generally higher fuel temperatures from the constant recirculation. The returned fuel 245*a/b* has been heated by the engine since a majority of the systems have the regulator in the engine compartment attached to the fuel injector rails or as close as possible to the carburetor(s). The higher the system pressure the more likely the returned fuel 245*a/b* will have entrained vapor bubbles during the transition from system pressure to atmospheric pressure in the return line.

FIG. 4A presents two embodiments of desirable fuel return line configurations for the invention. Fuel return line 240*a* is configured to for easy installation through an existing tank opening with the sender assembly 200, but directs return fuel 245*a* away from the fuel pump 210. Fuel return line 240*b* is configured to direct return fuel 245*b* towards fuel pump 210, but may be more difficult to install.

In embodiments where top surface 113 is non-permeable, the non-permeable surface may prevent vapor bubbles from being drawn through enclosure 110 by protecting the immediate area near the discharge of the return fuel line 240*a/b*.

Figure 4B:
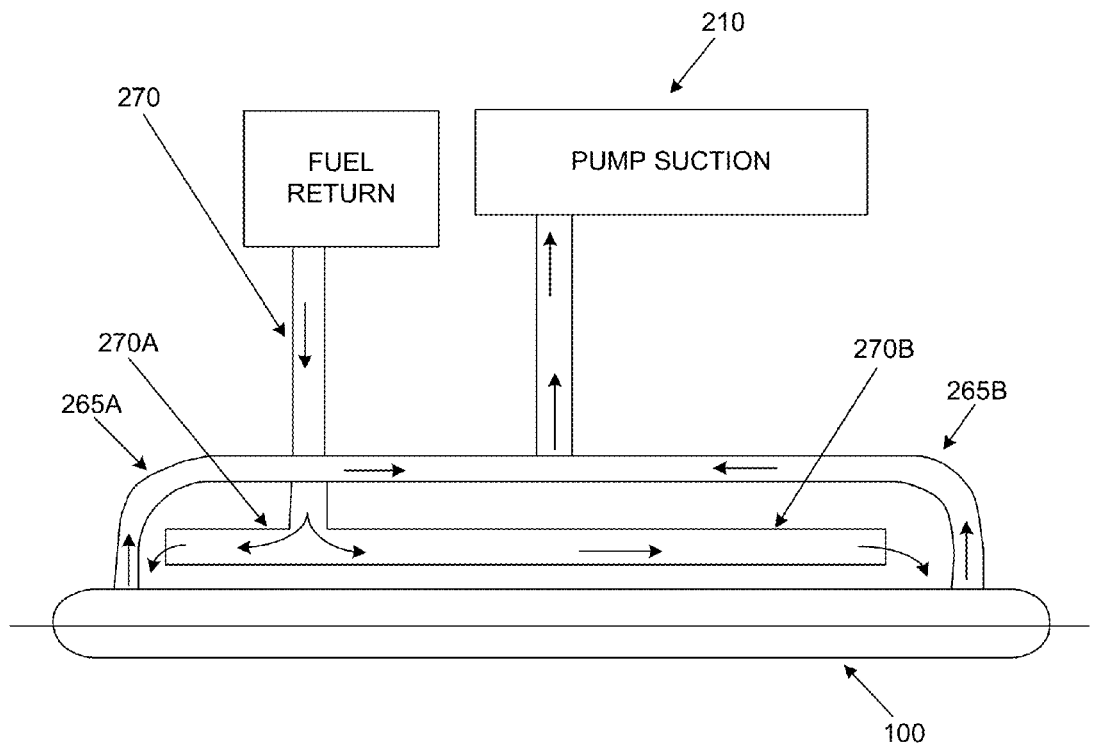
FIG. 4B is a schematic showing multiple suction points feeding a single outlet hose according to one embodiment.

FIG. 4B depicts an embodiment in which multiple suction points feed a single outlet hose. For example, suction points 265A and 265B are provided from liquid reservoir system 100 to pump 210. Fuel return line 270 return fuel from the regulator and has multiple discharge points 270A and 270B. This may be used to constantly wet the surface and protect the surface tension as long as there is return fuel. This fuel may then be pulled to the interior of liquid reservoir system 100 for reuse. In one embodiment, a separate return hose 270 may be provided to each fuel suction point.

Figure 5A:
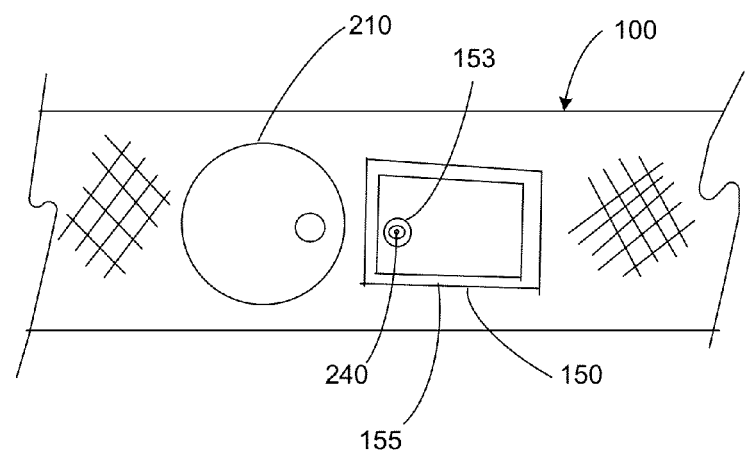
FIG. 5A is a schematic top view of a liquid reservoir system including a fuel retainer according to one embodiment.
Figure 5B:
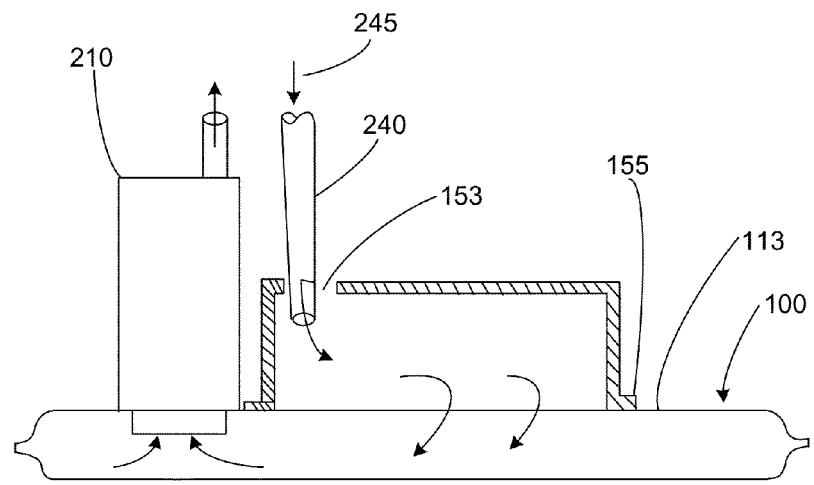
FIG. 5B is a schematic side view of the liquid reservoir system of FIG. 5A.

FIGS. 5A and 5B show another embodiment of liquid reservoir system 100 including fuel retainer 150. Fuel retainer 150 may be box-shaped with an open bottom adjacent to top surface 113 of liquid reservoir system 100. Fuel return line 240 enters through hole 153 in the top of fuel retainer 150, discharging return fuel 245 into fuel retainer 150. Return fuel 245 may then be readily accessible to fuel pump 210 through liquid reservoir system 100.

In one embodiment, fuel retainer 150 and/or hole 153 may be oversized to allow clearance around return line 240 to allow over flow fuel and/or entrapped air to escape. In another embodiment, fuel retainer 150 may include one or more additional hole and/or top opening to allow over flow fuel and/or entrapped air to escape (not shown). In another embodiment, fuel retainer 150 may include flange 155 which may be bonded to top surface 113 of liquid reservoir system 100 by adhesives, ultrasonic welding, hot plate welding, or any other suitable bonding means.

In one embodiment, liquid reservoir system 100 may also draw or wick fuel, via capillary action or other means, from any area of the tank that the liquid reservoir system reaches. In low fuel conditions this may maintain a fuel supply to the fuel pump inlet regardless of the size and/or shape of the fuel tank floor. This may be extremely valuable as it enables all the fuel in the fuel tank to be available for consumption. If one portion of liquid reservoir system 100 is in a location devoid of fuel, liquid reservoir system 100 may draw fuel from other locations where fuel is still accessible without ingesting air. The wicking ability of the media of the liquid reservoir system 100 may also reduce the need for the liquid reservoir system 100 to be in contact with the bottom of the tank, reducing the potential of transferring vibration/noise from the fuel pump.

In one embodiment, the surface tension of the wetted media of the liquid reservoir system 100 may prevent air from being drawn through it until substantially all the fuel is removed from liquid reservoir system 100 by the fuel pump. At this point, the surface tension may be broken by the air and the pump may ingest the air and lose fuel pressure.

In one embodiment, liquid reservoir system 100 may enable the fuel pump to draw all the fuel from the tank before the media permits air to be pulled into the fuel pump, regardless of vehicle dynamics.

In one embodiment, liquid reservoir system 100 may have a very low profile which displaces less fuel then the conventional, complicated molded reservoirs or metal baffle designs currently in vehicles both original equipment manufacturers and aftermarket suppliers.

In one embodiment, liquid reservoir 100 may be a thin reservoir with a single or thin layers of separation between the top and bottom media. This may minimize the ingestion of air so when additional liquid is added to the tank (or the liquid returns) it will have less air for the pump to pull out of the interior before the liquid is available which makes for a faster recovery of liquid pressure from the pump.

In one embodiment, the shape of liquid reservoir system 100 may be contoured depending upon the fuel tank design to reach particular areas of the tank. For example, circle/oval track vehicles will constantly force the fuel to the right side of the tank as they drive in the counterclockwise path. The liquid reservoir system can have a shape to favor the right side where the fuel tends to stay.

In one embodiment, liquid reservoir system 100 may have no moving parts and is substantially lighter and displaces less fuel than other reservoir and/or fuel access systems. The advantages are weight and/or cost reduction, and simplicity. This may permit more fuel in the same tank compared to other systems. For example, NASCAR fuel tanks have a high pressure pump that draws from a central reservoir. Additionally, there are multiple lift pumps that constantly draw fuel from remote areas of the tank and transfer the fuel to the central reservoir. These multiple pumps are agitating the fuel along with the heat from the electric motors which generates vapor that must be vented. Vaporized fuel cannot be used by the engine so it is lost to the atmosphere. These multiple pumps and lines also take up internal fuel tank volume which may reduce mileage between fuel stops, an undesirable feature in a vehicle such as a race car, an aircraft, a boat, etc.

In one embodiment, liquid reservoir system 100 may be shaped to fit in virtually any fuel tank design. It may contain an internal screen insert to keep the top and bottom separated and to give the liquid reservoir system a flatter profile on the tank floor. This insert also allows the liquid reservoir system to be folded or compressed together for ease of insertion into the generally smaller tank openings. The inlet port can be designed to seal on any in-tank electric fuel pump. This can also work with pumps external to the tank.

In one embodiment, the profile of liquid reservoir system 100 may be determined by the vehicle application. For example, in racing applications the liquid reservoir system may tend to occupy more of the bottom of the fuel tank than other applications.

In one embodiment, the liquid reservoir system may be completely or partially contained in an enclosure. The enclosure may have an open or closed top and may be mounted to the surface of the liquid reservoir system to keep more of the returned fuel closer to the pump. This may shorten the supply path to the pump inlet and may reduce the associated pressure drop.

In one embodiment, the fuel return line can be formed to be at a necessary and/or desired distance from the pump and then discharge fuel back towards the pump inlet.

In one embodiment, a plurality of liquid reservoir systems 100 may be used in a single fuel tank, covering different areas of the bottom of the fuel tank as needed and/or desired. These multiple reservoirs may be molded with transfer passages or have connecting tubes, hoses, passages and combinations thereof to transfer the liquid to the desired pick-up location.

In one embodiment, liquid reservoir system 100 may include one or more fittings for one or more liquid pick-up ports or for connecting one or more liquid reservoir together, or to connect one or more liquid reservoir to one or more pumps.

Figure 6:
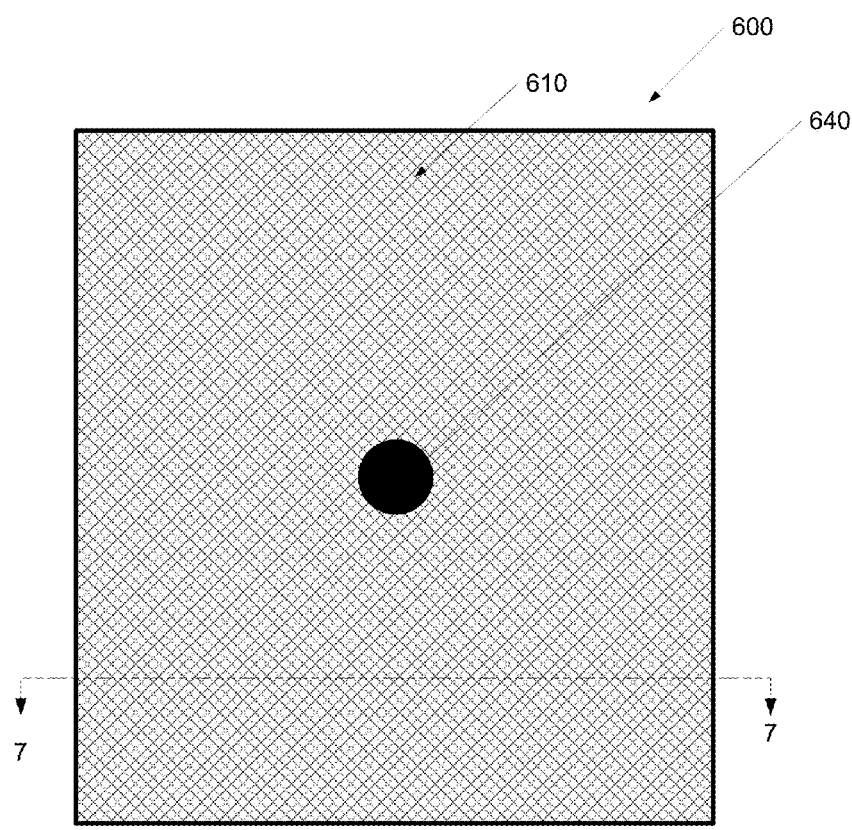
FIG. 6 is an illustration of a liquid reservoir system according to one embodiment.
Figure 7:
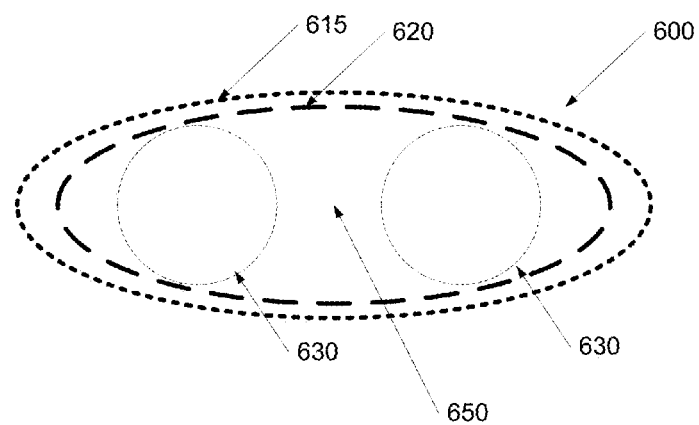
FIG. 7 is a sectional view of the liquid reservoir system of FIG. 6.

Referring to FIGS. 6 and 7, liquid reservoir system 600 is illustrated according to one embodiment. Liquid reservoir system 600 may include surround 610, which may comprise outer layer 615 and inner layer 620, one or more separating members 630, and liquid access port 640. Reservoir volume 650 is formed in the interior of inner layer 620.

In one embodiment, liquid reservoir system 600 may be provided in a fuel tank (not shown) for a vehicle (e.g., car, truck, boat, motorcycle, snowmobile, aircraft, armored vehicle, etc.). Any suitable fastening mechanism for fastening liquid reservoir system 600 to the fuel tank may be used, including, for example, hooks, magnets (e.g., with a steel tank), hoses, clips, ties, studs, fittings, weighting, etc. In one embodiment, liquid reservoir system 600 may be retained using rubber bladder dividers that may be molded in brackets and mounting points. In still another embodiment, liquid reservoir system 600 may be held in position by open cell foam blocks that may fill the remainder of the tank. In another embodiment, liquid reservoir system 600 may be retained by a drop-in fuel module, or may be retrofitted to fuel systems.

In another embodiment, liquid reservoir system 600 may be mounted to a device that follows the flow of liquid, such as a "swinging pickup" in a tank that moves with the liquid. For example, liquid reservoir system 600 may be suspended within the tank and allowed to move in one or more direction in response to vehicle movement. In one embodiment, liquid reservoir system 600 may be weighted to assist in such movement.

In still another embodiment, the device may be retrofitted to any existing pick-up tubes on, for example, a gas sending unit. In still another embodiment, the device could be mounted directly on a pump.

In one embodiment, liquid reservoir system 600 may be shaped to conform to the shape of the tank in which it is disposed. In another embodiment, liquid reservoir system 600 may also include portions that extend in order to be in substantially constant contact with liquid during liquid movement. For example, portions of liquid reservoir system 600 may extend perpendicular to the direction of movement so that at least some of liquid reservoir system 600 may maintain contact with a liquid during cornering, turning, etc. Similarly, portions of liquid reservoir system 600 may extend forward and backward (with respect to the direction of movement) in order to maintain contact with the liquid during acceleration or braking.

Figure 8:
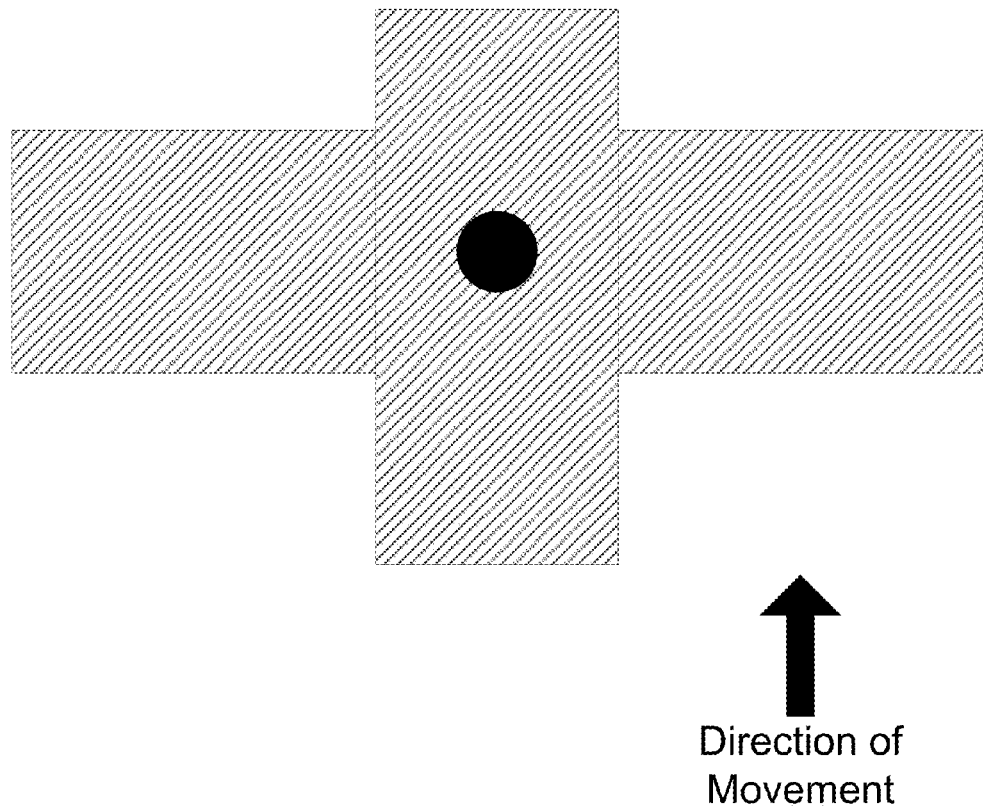
FIG. 8 depicts an exemplary shape for a liquid reservoir system.

An exemplary shape for liquid reservoir system 600 is provided in FIG. 8.

In one embodiment, liquid reservoir system 600 may have one or more "windows" included therein. In one embodiment, the window may reduce the volume of reservoir volume 650. Any size, shape, and/or number or windows may be provided. In one embodiment, the size, shape, and/or number of windows may be selected based on the application.

In one embodiment, liquid reservoir system 600 may be provided on an interior circumference of a tank in order to maintain contact with a liquid during inverted operation, such as for an aircraft.

In one embodiment, liquid reservoir system 600 may have any suitable configuration. For example, liquid reservoir system 600 may have an open layer top and bottom to provide maximum surface area for fuel scavenging. In another embodiment, liquid reservoir system 600 may have a sealed top layer to draw fuel from the bottom surface. In another embodiment, liquid reservoir system 600 may have pleated side panels to allow for greater flexibility. In another embodiment, inner layer 620 may comprise a plurality of materials. In still another embodiment, liquid reservoir system 600 may comprise multiple reservoirs, such as a smaller liquid reservoir system 600 inside a larger liquid reservoir system 600.

In still another embodiment, liquid reservoir system 600 may have a contoured shape for a specific flow control. Examples shapes include a cross shape, a "T"-shape, an "X"-shape, an "H"-shape, a "C"-shape, an "I"-shape, a "V"-shape, a star shape, a dog bone shape, a dog leg shape, a bowtie shape, a triangular shape, a round shape, an irregular shapes, a circular shape, an oval shape, an elliptical shape, etc. In addition, it may be a polygon, a cube, a box, a pyramid, flat, spherical, semi-spherical, cylindrical, round, thick, thin, long, skinny, etc. Any other shape or configuration that is conducive to being folded and inserted thru a small orifice may be used as is necessary and/or desired.

In one embodiment, any of the shapes or configurations may be provided with one or more cut-outs as is necessary and/or desired.

In one embodiment, the shape or configuration may be selected based on the shape of the tank, the anticipated activity (e.g., high g-forces, low g-forces, etc.), installation ease (for tanks with large openings), etc.

Shapes that are more tailored to coverage and volume rather than installation ease (for fuel cells and other tanks with large openings)

In another embodiment, liquid reservoir system 600 may include internal baffles to specifically control flow within the reservoir system for optimum delivery of the liquid to the pump inlet or port.

In one embodiment, liquid reservoir system 600 may include an external reservoir. An example of such a system is illustrated in FIGS. 9 to 11.

Liquid reservoir system 900 includes external reservoir 910 that holds a liquid around the outlet to the pump. In one embodiment, external reservoir 910, may be made of plastic or metal.

Figure 9:
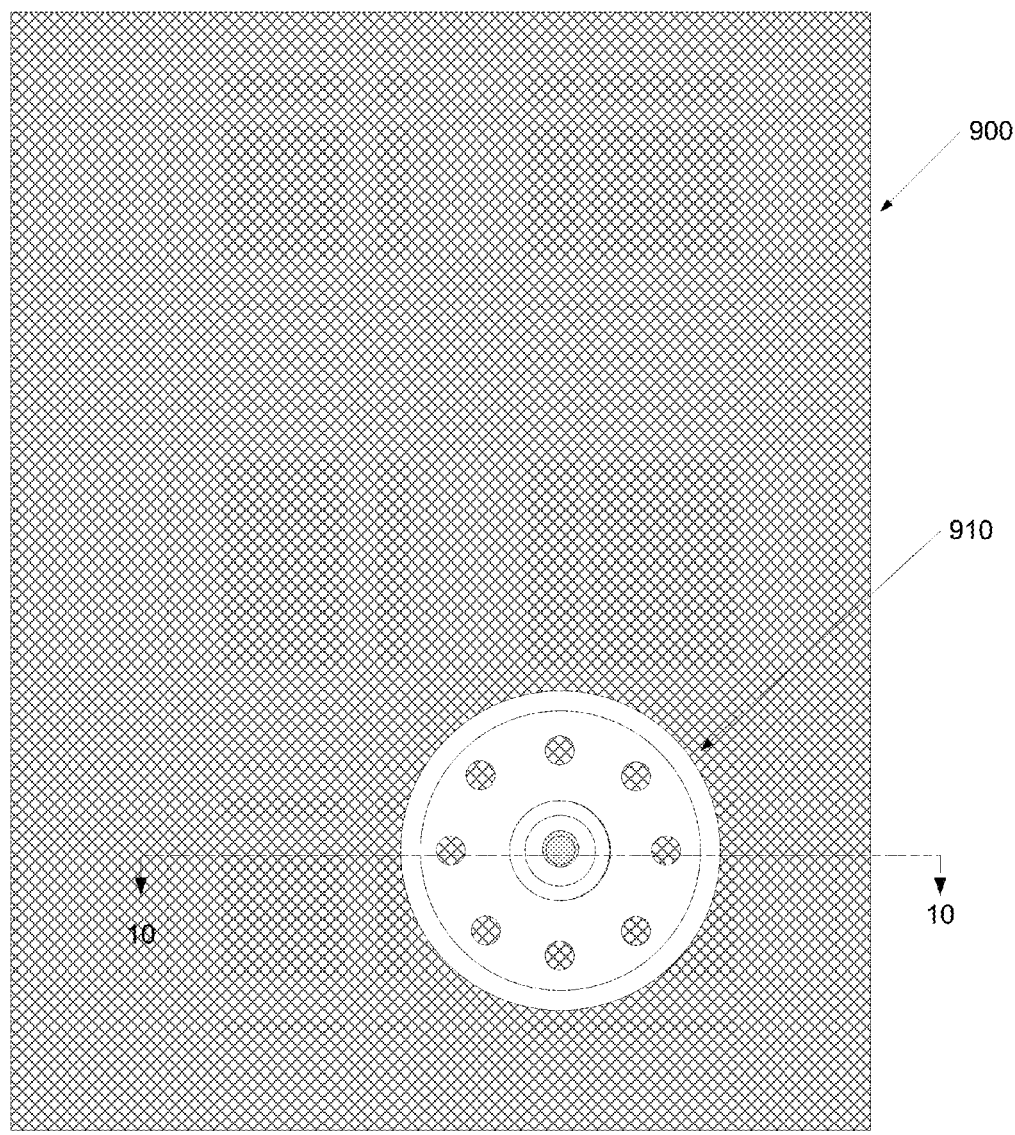
FIG. 9 depicts an liquid reservoir system that includes an external reservoir according to one embodiment.
Figure 10:
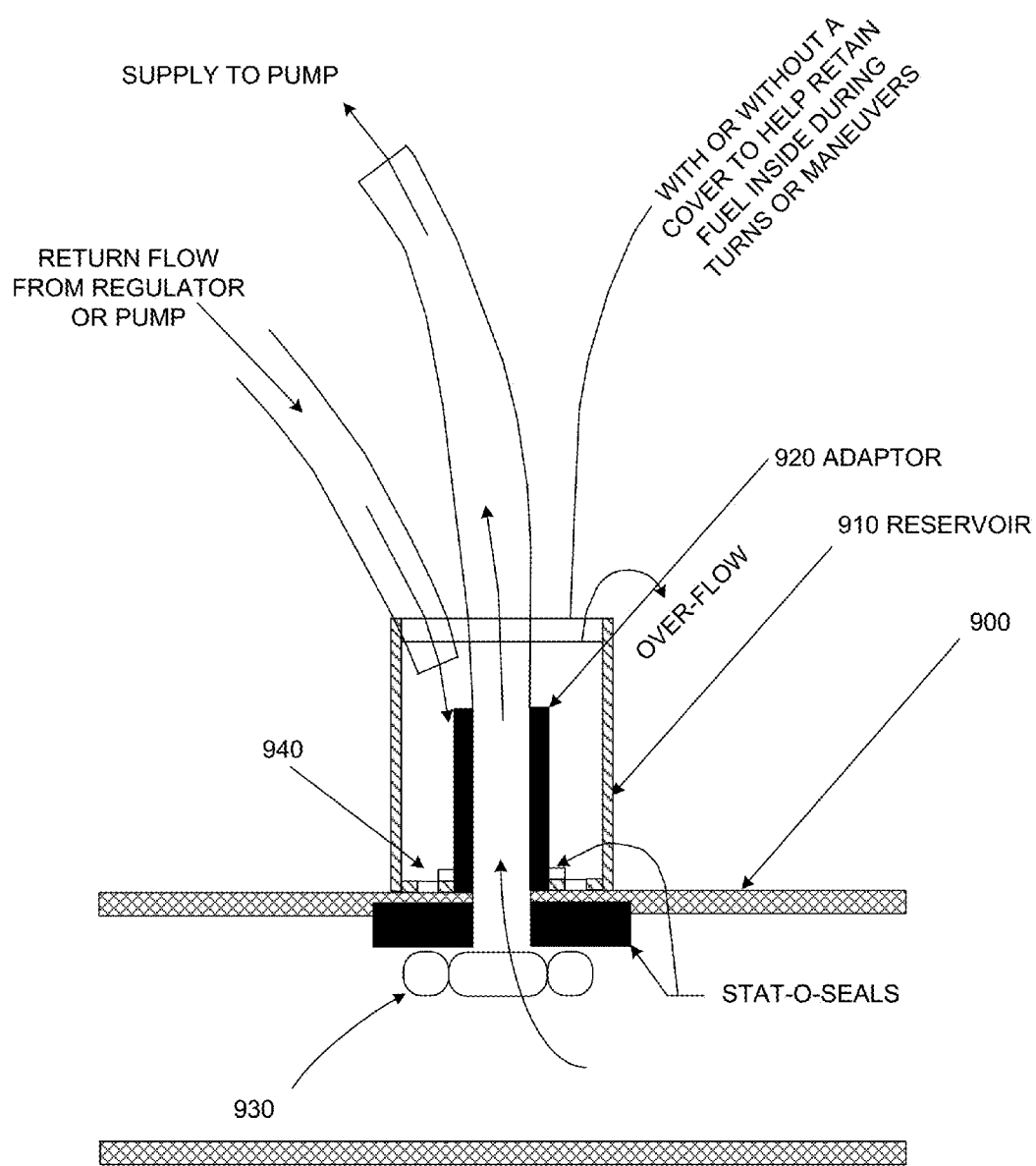
FIG. 10 is a sectional view of the liquid reservoir system that includes an external reservoir of FIG. 9.

FIG. 9 is similar to FIG. 5B except that the top of external reservoir 910 may be open (in FIG. 10 it has a cover) and external reservoir 910 (e.g., 57R120) may be secured by adapter 920(e.g., B985010 ERL) and fastener 930 (e.g., nut B992410 ERL). Seals (e.g., Strat-o-seals 27R1078) may be provided. In one embodiment, no adhesive is used; only a clamping force is used. The return fuel supply will typically over-flow the reservoir due to the extra amount the pump supplies compared to the actual engine consumption.

Holes 940 may be provided on the floor of external reservoir 910 and may communicate to the surface of the media in an effort to retain more of the returned liquid available close to the outlet fitting. This reduces the distance the liquid travels and helps maintain the wet media to extend the surface tension and thereby preventing air intrusion.

External reservoir 910 may be provided on any portion of the liquid reservoir system. In on embodiment, it may be closer to the side or area which the "G" forces are expected to move fuel. For example, for road course racing, external reservoir 910 may be centered as the "G" forces may vary in multiple directions. For oval track racing, external reservoir 910 may be located toward the outside edge. For drag racing, external reservoir 910 may be located toward the rear.

In still another embodiment, a return may be provided within liquid reservoir system 600 if aeration of the liquid being returned from the engine/fuel injectors or other device is below acceptable levels.

FIG. 11 depicts exemplary dimensions for external reservoir 910 according to one embodiment. The dimensions provided are exemplary only and it should be recognized that the dimensions may vary according to application.

As shown in detail B, the perimeter of the external reservoir presses against the outer surface of liquid reservoir system to direct fuel through the holes rather than letting "G" forces move the fuel away from the supply hose to the pump.

Any other suitable construction, orientation, and/or shape may be used as necessary and/or desired.

In one embodiment, outer layer 615 may comprise a webbing of flexible plastic material that may form an enclosure. In one embodiment, outer layer 615 may comprise two sheets of material that may be sealed along the perimeter. Outer layer 615 may be used to maintain a shape for liquid reservoir system 600, and may provide coarse some filtering of the liquid, and may also protect inner layer 620 from damage.

In one embodiment, inner layer 620 may comprise a material that absorbs and/or wicks liquid from the surrounding environment. When wet, inner layer restricts the passage of a gas, such as air, by providing a barrier against air intrusion until liquid is drawn from inner layer 620 by, for example, a pump, or until such time that liquid is again available at outer layer for scavenging.

In one embodiment, inner layer 620 may comprise a filter material. In one embodiment, inner layer 620 may have a filtration size rating of 5 to 40 microns. In another embodiment, inner layer 620 may have a filtration size rating of between 10 to 30 microns.

Most OEM filter socks have 70 micron pore sizes. A few have 30 micron pore sizes. Both sizes, however, are too coarse for the liquid reservoir disclosed herein (as it relates to fuel), as the pores are too large to seal properly to draw liquid from the reservoir. Depth media, the filter material of choice for conventional inlet filters, typically do not reach the certain areas of the fuel tank.

In one embodiment, outer layer 615 and/or inner layer 620 may not be uniform in construction. For example, the portion of outer layer 615 and/or inner layer 620 that may contact the liquid may comprise a material that is pervious to the liquid, while the portion that is not in contact with the liquid (e.g., the portion against the tank wall) may be made of a different material. For example, a top surface of inner layer 620 may have a filtration size rating of 10 microns, while a bottom surface may have a filtration size rating of 30 microns. Using the smaller filtration size rating on the top surface of inner layer 620 may be beneficial because the top surface may be exposed to air first as the fuel in the fuel tank is consumed, and the smaller filtration size rating will resist air intrusion into reservoir volume 650 better than larger filtration size rated media.

In one embodiment, the filtration size rating may vary depending on the type of fluid, environmental conditions (e.g., temperature, pressure, etc.).

One or more separating members 630 may be provided. In one embodiment, separating members 630 may be flexible and may deform by a certain amount. In one embodiment, separating members 630 may not deform to the point where opposite sides of inner layer 620 touch substantially. Separating members 630 may have any suitable shape and may be made of any suitable material. In addition, separating members 630 may have any suitable orientation. The number, shape orientation, and/or material may be selected for the environment in which liquid reservoir system 600 is used and/or the shape of liquid reservoir system 600.

In one embodiment, separating members 630 may be cylindrical, and may be made of plastic.

In one embodiment, separating members hold surround 610 apart to create a reservoir of liquid within inner layer 620. This may extend the user of the reservoir before air intrudes. For example, under low fuel conditions, such as when the bulk of liquid reservoir system 600 is uncovered and exposed to air, the liquid within reservoir volume 650 may be withdrawn by, for example, a fuel pump (not shown), causing surround 610 to collapse on itself. Support members 630 prevent surround 610 from completely collapsing on itself, acting like a spring, in order to deplete the reservoir capacity to as much as possible before air ingestion. This may extend the surface tension of the liquid (e.g., fuel) within reservoir volume 650 to delay the air intrusion.

When liquid reservoir system 600 is again surrounded by liquid, the reservoir function maintains its full capacity within reservoir volume 650 by virtue of this webbing spring function. The velocity of the liquid through outer layer 615 and inner layer 620 is not restricted.

In one embodiment, the volume of the reservoir of liquid in liquid reservoir system 600 may be selected based on the pump flow in order to determine an approximate "reserve time." For example, the reserve time may vary from a few seconds to a few minutes or more, depending on the size of the liquid reservoir and the pump flow/volume.

Liquid access port 640 may be installed through one side of liquid reservoir system 600 based on, for example, vehicle dynamics, tank shape, liquid reservoir system 600 shape, etc. In one embodiment, a seal (not shown) may be provided on each side and compressed using, for example, a jamb nut against the fitting flange Liquid access port 640 may be connected to fuel pump (not shown) using a fuel line (not shown), such as a tube, hose, etc.

In one embodiment, liquid reservoir system 600 may be sized to occupy the entire "floor" of a fuel tank for two reasons. First, the larger size generally results in a larger reservoir volume 650, which means the fuel pump can draw fuel for a longer time before air intrusion.

Second, a large size generally results in a larger surface area and therefore a lower velocity of fuel through outer layer 615 and inner layer 620. This will extend the life of the boundary layer of fuel inside the media to before air intrusion.

An exemplary method for determining the proportions of the liquid reservoir system 600 is based on where a two gallon quantity is located in a specific fuel tank. For example, in this method, two gallons of fuel is placed in the specific tank and then the tank is placed on a 30° angle to approximate a 1 G load and then measure the closest point to the center of the tank. This may be repeated four times (once for each side). The result may be a generally rectangular shape for the liquid reservoir system 600, which may be more than adequate for the typical street vehicle. In this example, two gallons of fuel—which is typically the amount of residual fuel in the tank when the gage registers empty—is used; other amounts of fuel may be used as necessary and/or desired. The amount may vary depending on vehicle type (e.g., truck, car, aircraft, etc.), application (e.g., normal driving versus racing), etc.

Although several embodiments are disclosed, it should be recognized that these embodiments are not necessarily exclusive. Some or all of the features of one embodiment may be combined with some or all features of other embodiments as necessary and/or desired.

EXAMPLES

The following examples of a liquid reservoir system is provided. This example is illustrative only and does not limit the present disclosure.

A 1992 S/S 1500-Series pickup truck was equipped with the ARCA fuel cell in the bed with the following modifications:

1. Replace the bladder supplied in the ARCA fuel cell with the ATL#FB222D 100 Series. There are no surge tanks inside.

2. Modify the flange to add −10×90° bent tube fuel outlet fittings and −8×90° bent tube return line fittings. Cap existing −10 welded supply fitting.

3. Insert a liquid reservoir system in the bottom of the bladder with the supply hose positioned on the passenger-side of the fuel cell.

4. −10×90° bent tube fuel outlet fittings and −8×90° bent tube return line fittings were attached between the flange and the liquid reservoir system using the Earl's S/S Ultra-Flex hose.

5. Secure the return line fitting to discharge hose 1" above the liquid reservoir system at the supply fitting.

6. Replace the yellow open cell foam with the black, large pore, open cell foam and install on top of the liquid reservoir system.

7. Install the Holley 12-1600, 12-848 regulator and the 162-570 (10 micron) post filter. The regulator was positioned at the fuel cell to eliminate the need for a lengthy return line and ease of installation.

The test method was as follows:

1. Add approximately two gallons of premium 93 octane, pump grade gasoline to the fuel cell.

2. Drive an oval track at a safe, maximum speed until the engine dies.

3. Weigh the fuel cell assembly to determine the amount of unused fuel remaining in the fuel cell.

Results after Test #1:
Drive in the counter-clockwise direction
Dry fuel cell weighs 42.7 LBS.
Fuel cell after run-out-of-fuel test (ROF) is 43.9 LBS.
Remaining fuel is 0.2 gallons
ROF event:
Truck maintained 44-46 psi of fuel pressure for approximately ten laps. The last two laps, the fuel pressure began to fall (25-35 psi) and it would stumble upon exit of turn 2 and 4, then finally die on the 12th lap. Fuel pressure was 22 psi when it died.

Re-priming after adding two gallons occurred after approximately five seconds (two cycles of the key to prime the pump).

Results after Test #2:
Drive in the counter-clockwise direction.
Dry fuel cell weighs 42.7 LBS.
Fuel cell after (ROF) is 44.2 LBS.
Remaining fuel is 0.25 gallons.

In the preceding specification, various preferred exemplary embodiments have been described with reference to the accompanying drawings. It will, however, be evident that various modifications and changes may be made thereto, and additional exemplary embodiments may be implemented, without departing from the broader scope of the invention as set forth in the claims that follow. The specification and drawings are accordingly to be regarded in an illustrative rather than a restrictive sense.

What is claimed is:

1. A liquid reservoir structure comprising:
    an outer top layer and an outer bottom layer being sealingly connected along their periphery and defining an internal reservoir volume, an inner layer disposed within the outer top layer and the outer bottom layer, wherein at least a portion of the outer layers and the inner layer comprise a permeable material, said outer layers and said inner layer having different filtration size ratings wherein said inner layer has a finer filtration size rating than said outer layers;
    at least one flexible, permeable, and at least partially collapsible separator positioned between the outer top layer and the outer bottom layer within the internal reservoir volume, said separator capable of allowing insertion and removal through a small opening of a fuel tank, the at least one flexible separator maintaining a variable separation between the outer top layer and the outer bottom layer; and an outlet port in the top layer and communicating the internal reservoir volume, wherein the outlet port is in communication with a vacuum source by a pump line;

at least one standoff extending from above said outer top layer into said liquid reservoir structure and against an inner surface of said inner layer to inhibit collapse of said liquid reservoir structure;

wherein liquid is drawn into the internal reservoir volume through the permeable material creating a boundary layer of liquid due to surface tension of said liquid on said permeable material and further wherein said liquid is drawn through the outlet port;

further wherein said liquid reservoir structure is configured to be sized to increase a reserve time.

2. The liquid reservoir structure of claim 1, further comprising a plastic webbing surrounding the top layer and the bottom layer.

3. The liquid reservoir structure of claim 1, wherein the permeable material comprises a filter material having a filtration size rating between about 5 microns and 40 microns.

4. The liquid reservoir structure of claim 1, wherein filter material has a filtration size rating between about 10 microns and 30 microns.

5. The liquid reservoir structure of claim 1, further comprising:
an external reservoir positioned proximate to the outlet port on an outer surface of the top layer, wherein the external reservoir holds liquid around the outlet port to the vacuum source.

6. The liquid reservoir structure of claim 5, wherein the external reservoir comprises a plurality of holes on a lower portion that is in contact with the outer surface of the top layer.

7. The liquid reservoir structure of claim 1, further comprising a liquid return that returns liquid from the vacuum source to an external surface of the liquid reservoir structure.

8. The liquid reservoir structure of claim 1, further comprising a second liquid return.

9. The liquid reservoir structure of claim 1, wherein the at least one flexible separator has a cylindrical shape.

10. The liquid reservoir structure of claim 1, wherein the at least one flexible separator has a half-cylindrical shape.

11. The liquid reservoir structure of claim 1, further comprising: at least one fastening mechanism for fastening the liquid reservoir structure to a tank.

12. The liquid reservoir structure of claim 11, wherein the fastening mechanism comprises at least one of a magnet, a hook, a hose, a clip, a tie, a stud, a fitting, and a weight.

13. The liquid reservoir structure of claim 1, wherein the outlet port is positioned in the liquid reservoir structure based on a force that will be applied to the liquid reservoir structure.

14. The liquid reservoir structure of claim 1, further comprising:
a second outlet port in the top layer and communicating the internal reservoir volume.

15. The liquid reservoir structure of claim 13, wherein the outlet port and the second outlet port communicate to the vacuum source.

16. The liquid reservoir structure of claim 1, further comprising:
an external reservoir provided on the top layer, the external reservoir in communication with the vacuum source via at least one return line.

17. A liquid reservoir system, comprising:
a tank having at least a lower surface and an upper surface,
a pump; and
a liquid reservoir comprising:
an outer top layer and an outer bottom layer, the outer top layer and the outer bottom layer being sealingly connected along their periphery and defining an internal reservoir volume, an inner layer disposed within the outer top layer and the outer bottom layer wherein at least a portion of the outer top layer and the outer bottom layer comprise a permeable material, and said outer layer and said inner layer have different filtration size rates;
at least one flexible, permeable, and at least partially collapsible separator positioned between the outer top layer and the outer bottom layer within the internal reservoir volume, the at least one flexible separator maintaining a variable separation between the outer top layer and the outer bottom layer while also allowing insertion and removal through a small opening of a fuel tank;
an outlet port in the outer top layer and communicating with the internal reservoir volume, wherein the outlet port is in communication with the pump by a first pump line; and,
at least one standoff extending from above said outer top layer into said liquid reservoir structure and against an inner surface of said inner layer to inhibit collapse of said liquid reservoir structure;
wherein liquid is drawn into the internal reservoir volume through the permeable material creating a boundary layer due to surface tension of said liquid on said permeable layer and further wherein said liquid is drawn through the outlet port; and
wherein the liquid reservoir is positioned on the lower surface of the tank and the liquid reservoir is configured to be sized to increase a reserve time.

18. The liquid reservoir system of claim 17, wherein the liquid reservoir has a shape that conforms to the lower surface of the tank.

19. The liquid reservoir system of claim 17, wherein the liquid reservoir has a shape that is adapted for an operating environment of the tank.

20. The liquid reservoir system of claim 17, wherein the tank further comprises an opening, and the liquid reservoir is adapted to be introduced to an interior of the tank through the opening.

21. The liquid reservoir system of claim 17, further comprising a return line from the pump, wherein the return line returns fluid from the pump to one of the top layer and the bottom layer of the liquid reservoir.

22. The liquid reservoir system of claim 17, further comprising a second pump line for communicating a second port with the pump.

23. The liquid reservoir system of claim 21, further comprising a second return line from the pump, wherein the second return line returns fluid from the pump to one of the top layer and the bottom layer of the liquid reservoir.

24. The liquid reservoir system of claim 17, further comprising a fastening device for securing the liquid reservoir to the tank, the fastening device comprising at least one of a magnet, a hook, a hose, a clip, a tie, and a weight.

25. The liquid reservoir system of claim 17, wherein at least a portion of the tank comprises an open-cell foam material, the open-cell foam material applying a force to substantially maintain a position of the liquid reservoir.

26. The liquid reservoir system of claim 17, wherein the liquid reservoir further comprises a plastic webbing surrounding the outer top layer and the outer bottom layer.

27. The liquid reservoir system of claim 17, wherein the permeable material comprises a filter material having a filtration size rating between about 5 microns and 40 microns.

28. The liquid reservoir system of claim 17, wherein filter material has a filtration size rating between about 10 microns and 30 microns.

29. The liquid reservoir system of claim 17, wherein the liquid reservoir further comprises:
    an external reservoir positioned proximate to the outlet port on an outer surface of the top layer, wherein the external reservoir holds liquid around the outlet to the vacuum source.

30. The liquid reservoir system of claim 29, wherein the external reservoir comprises a plurality of holes on a lower portion that is in contact with the outer surface of the top layer.

31. The liquid reservoir system of claim 29, wherein the at least one flexible separator has a cylindrical shape.

32. The liquid reservoir system of claim 29, wherein the at least one flexible separator has a half-cylindrical shape.

33. The liquid reservoir structure of claim 1 wherein said liquid reservoir is sized proportionally to the reserve time.

* * * * *